Feb. 25, 1969    N. MAROPIS ET AL    3,429,028
VIBRATORY WELDING APPARATUS AND METHOD
Filed June 28, 1965    Sheet 1 of 4

INVENTORS
NICHOLAS MAROPIS
JAMES BYRON JONES
BY Seidel & Gonda
ATTORNEYS.

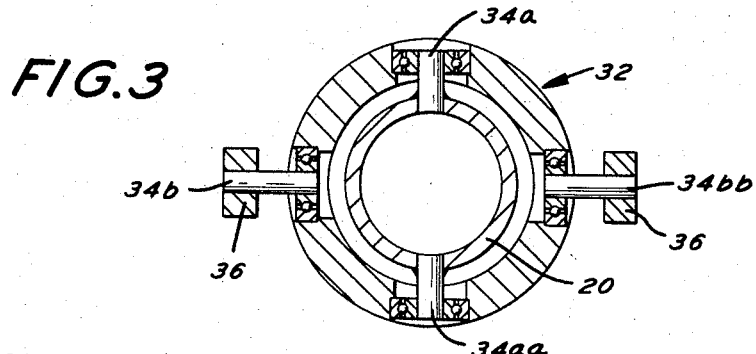
FIG. 3
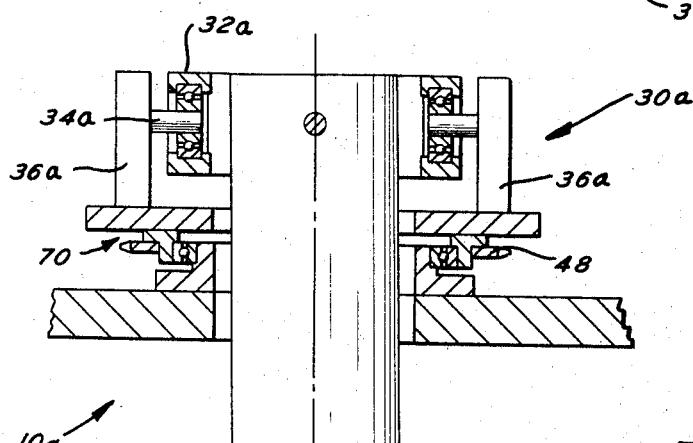
FIG. 4
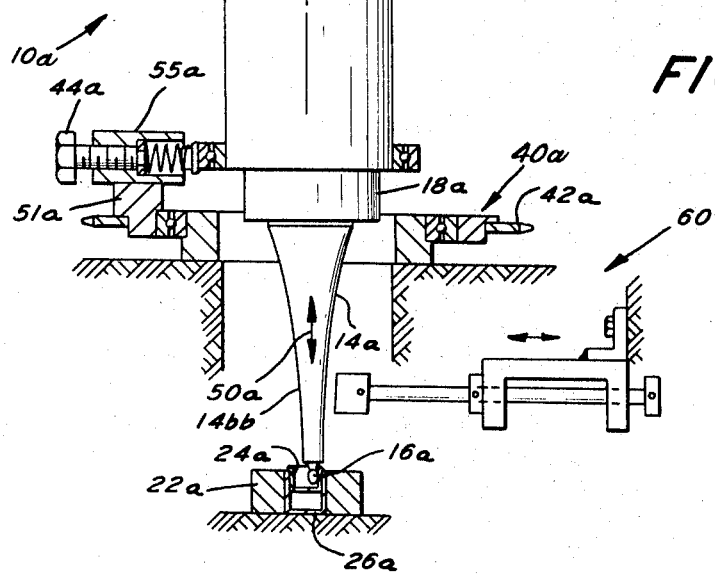

INVENTORS
NICHOLAS MAROPIS
JAMES BYRON JONES
BY
Seidel & Gonda
ATTORNEYS.

United States Patent Office 3,429,028
Patented Feb. 25, 1969

3,429,028
VIBRATORY WELDING APPARATUS AND METHOD
Nicholas Maropis and James Byron Jones, West Chester, Pa., assignors, by mesne assignments, to Sonobond Corporation, West Chester, Pa., a corporation of Pennsylvania
Filed June 28, 1965, Ser. No. 467,358
U.S. Cl. 29—470.1                     13 Claims
Int. Cl. B23k 21/00, 1/06, 5/20

ABSTRACT OF THE DISCLOSURE

Arcuate workpieces are ultrasonically welded by means of a welding tip supported so that its longitudinal axis may generate a cone having its apex at the support means while rotating the location of application of impelling force applied to said member to maintain the work pieces in intimate contact. If and when the welding tip is rotated about its longitudinal axis, the location of application of the impelling force is rotated in an opposite direction.

---

This invention relates to vibratory welding, usually termed ultrasonic welding, and more particularly to an apparatus and method for performing vibratory welding of special geometries, including geometries wherein it is desirable or necessary to perform welding internally of a tube or other container.

Examples of such welding applications include the joining of a container wall to a cap or other closure, the making of tube-to-header joints (as in heat exchangers), etc. The accomplishment of good joints in such geometries has heretofore been unusually difficult. For example, current procedures for assembling aircraft oil coolers require the joining of aluminum alloy tubes to header plates by flame-annealing the tube ends and then swaging (not welding) them into the plates. However, the annealing may adversely affect metal strength, while the swaging may introduce stress-corrosion cracking susceptibility areas with resultant reduced assembly service life. Often the closure-sealing of filled containers also presents problems, particularly if the container is filled with a delicate product or if the closure-container joining area is difficult of access to conventional welding tools.

Ultrasonic welding per se offers unique advantages, including strength, ability to join similar or dissimilar materials (including metals and some nonmetals), hermetic sealing, reduced prewelding cleaning requirement and storage criticality for weldment materials, no necessity for passage of electric current or for unacceptable deformation to perform welding, no melting of metal in the weld zone (with resultant brittle cast structure), usually no need for external heat application to facilitate welding, only a sharply-transient highly-localized temperature rise in the weld zone which does not approach the metal melting point, etc.

For example, it has been proposed heretofore, as in United States Patent 3,184,841, issued May 25, 1965 entitled "Method and Apparatus Employing Vibratory Energy for Bonding Metals," to use torsional vibration for joining a tube to a plate. However, in that patent, for special-geometry welding as opposed to flat-sheet welding, access to the work was facilitated, power requirements were reduced, and production-processing reliability and reproducibility were enabled by modification of the tube end in contact with the plate (and sometimes modification of the welding tip). Such modification is not always desirable or acceptable. Also, some geometries (such as cylinders) have had diameters which were beyond the capacities of existing ultrasonic welding equipment. Attempts have been made to solve the clamping-force-application problem in such geometries by means such as press-fitting of the tip within the cylinder, or by a split-coupler-tip configuration acting as a spring. However, such means have not been completely successful, at least for commercial purposes.

The present invention permits vibratory welding of geometries which have not previously been simply and reliably weldable. Using the longitudinal mode of vibration (which often is easier to provide than the torsional mode), it can accommodate the larger workpiece sizes and avoid the weldment or other modifications heretofore resorted to for appropriate access and suitable vibration and clamping force application.

This invention has as an object the provision of an apparatus for cylinder welding.

This invention has as another object the provision of a method for welding a cylinder to another geometry.

This invention has as a further object the provision of an apparatus and method for welding the inner periphery of a container.

This invention has as a still further object the provision of apparatus and method for force rotation during vibratory welding.

This invention has a still another object the provision of apparatus and method for force rotation and welding tip counter-rotation under precisely controlled conditions of each variable.

Other objects will appear hereinafter.

For the purpose of illustrating the invention there are shown in the drawings forms which are presently preferred, it being understood, however, that this invention is not limited to the precise arrangements and instrumentalities shown.

FIGURE 3 is a cross sectional view of the gimbal ring assembly of FIGURE 1.

FIGURE 4 is a view, partly schematic and partly elevational, of another embodiment of the vibratory welding apparatus of the present invention.

Referring to the drawings, wherein like numerals indicate like parts, a basic embodiment of the vibratory welding apparatus of the present invention is shown in FIGURE 1 and is designated generally as 10.

Figure 1:
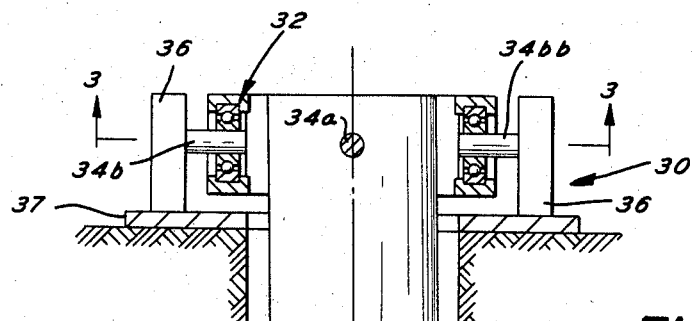
FIGURE 1 is a view, partly schematic and partly elevational, of one embodiment of the vibratory welding apparatus of the present invention.

The apparatus 10 is essentially of the general type described in United States Patent 2,946,120, issued July 26, 1960 in the names of James Byron Jones, William C. Elmore, and Carmine F. De Prisco, entitled "Seam Vibratory Welding Apparatus and Method." However, special features are provided in accordance with the present invention.

The apparatus 10 comprises, within a housing 20, an electromechanical transducer (not shown) connected to an acoustical coupling member 14. To the end of coupler 14 remote from the transducer is attached a welding tip 16. Preferably also (as explained in the aforesaid patent and as will be explained below) attached to member 14 is a force insensitive support mount 18. Mount 18 has a radially outwardly extending flange (not shown) which is attached to the housing 20. For purposes of the embodiment of FIGURE 1, the apparatus 10 also includes a hollow acoustically noncompliant anvil support member 22 for the workpieces 24 and 26 to be welded together.

In order to position the workpieces for welding purposes, the anvil 22 should be retractable (as by means of a way slide and air piston, for example) for ease of workpiece installation. Also, the welding tip 16 should simultaneously be temporarily removed from contact with the workpieces by means of a hinged or sliding stop (such as the assembly generally designated 60 in FIGURE 4). Moreover, the workpiece 26 in the anvil 22 is prevented from moving down through the anvil by an appropriate limit stop. As may be seen more clearly in FIGURE 2, the workpiece 24 of FIGURE 1 is cup-shaped and fits tightly within the upper hollowed portion of workpiece 26. It will be appreciated that means other than those described may be used for installing the workpieces and for maintaining them in fixed position for welding. Among such other means are fixturing and/or workpiece modification.

The apparatus 10, at its end remote from the welding tip 16, is supported in gimbal means 30 so that the welding tip end of the system can traverse a small circle, i.e., so that the axis of the apparatus 10 will execute a very restricted conical locus. Thus, the housing 20 is supported in the gimbal ring 32 by trunnions 34a and 34aa. Gimbal ring 32 is externally supported on trunnion supports 36 by trunnions 34b and 34bb. A common base 37 is provided for supports 36. This hinging arrangement (which is more clearly shown in FIGURE 3) frees the welding tip 16 for movement in a circle as defined by the inner periphery of the workpiece 24, with the side of the welding tip 16 in contact with said inner periphery by rotation of the force system which is generally designated as 40. During such movement of the tip 16, the axis of the system generates a cone having its apex at the ring 32.

Force system 40 has a sprocket 42 to which is attached a chain drive system (see the force rotation drive portion of FIGURE 5) which includes a single-revolution clutch of the type which is conventional on machinery such as a punch press. The clamping force necessary for welding may be set, by means for example of the adjustment screw 44 operating on the spring 46, to a value known from experience or experiment to be in the range for successful welding of the material and thickness combinations of the workpieces 24 and 26.

The sprocket 42 is connected to the outer periphery of a ring shaped mounting plate 51 supported on a convenient support by bearings 53. The screw 44 is threaded to a housing 55 fixed to the plate 51. The spring 46 is disposed within the housing 55 and contacts a double race bearing 57 surrounding housing 20.

At the initiation of the weld cycle, the force system 40 is stationary in its fixed rest position. Upon initiation of the weld cycle, the force system 40 rotates 360 degrees around the apparatus 10 until it comes to rest in its initial stationary position on completion of the weld cycle.

Thus, to accomplish welding around the 360 degrees of the inner periphery of the workpiece 24 (whose outer periphery is in juxtaposition to the inner periphery of the workpiece 26), electrical energy is applied to the transducer (so as to vibrate the members 14, 16, and 18 in the direction of the double-headed arrow 50 at the design frequency of the vibration system, such as at 15,000 cycles per second) and simultaneously the force system 40 is caused to rotate 360 degrees about the vertical axis of the apparatus 10 (while the force is being applied substantially perpendicular to the direction of vibration). The tip 16, while being both vibratorily activated and under the influence of the force application and rotation, will be hinge-freed as aforesaid to slide around the inner periphery of the workpiece 24, producing a vibratory weld 25 (see FIGURE 2) in the interfacial area of the workpieces 24 and 26 beneath the side of the welding tip 16.

A variable-speed motor may be used to permit changing the peripheral velocity of the welding tip 16, while microswitches can initiate and terminate vibration over an exact 360 degree precession of the welding tip.

In one application of the embodiment of FIGURE 1, a coupling member 14 having an internal exponential taper (rather than the external taper of FIGURE 1) and an annular welding tip, was used in conjunction with an apparatus designed to operate at a nominal frequency of 15 kc., which was powered by a 2-kilowatt electron-tube power source. The tip was made of Type M–2 high-speed steel hardened to Rockwell C61–63 and had an outside diameter of 1.148 inches and a crown radius. The tip was silver-brazed to the terminal section of the member 14. Support for a canister-type weldment such as that of FIGURE 6 during welding was provided by a hollow copper anvil block having a threaded-in steel collar which was tightened with a spanner wrench to eliminate slippage during welding.

The canister had been impact-extruded from 1100–0 aluminum to an outside diameter of 1.250 inches, a nominal wall thickness of 0.020-inch, and a length of 2.588 inches. It was to be welded to a cover having a diameter of approxiamtely 1.205 inches made from 0.015-inch 3003–H14 aluminum alloy. Cover-to-canister weld sealing feasibility was demonstrated, with manual peel tests of welded assemblies indicating that satisfactory quality welding could be obtained at welding machine settings of 1900 watts of electrical power input to the transducer, 150 pounds clamping force, and a peripheral tip speed of 246 inches/minute.

The apparatus 10a of FIGURE 4 is identical with the apparatus 10 of FIGURE 1, except that a means 70 has been provided for rotating the gimbal means 30a, so as to cause the welding tip 16a of FIGURE 4 to rotate in a direction opposite to the rotation direction of the force system 40a. Accordingly, the corresponding components of apparatus 10a are provided with corresponding numerals followed by the letter a where applicable. Such reversed rotation of the gimbal ring assembly 30a is for a number of degrees (as will be explained below) sufficient so that the tip 16a rolls rather than slips on the inner periphery of the workpiece 24a which is being welded to the workpiece 26a.

The apparatus 10a has particular utility in welding applications wherein welding tip sliding may occasion a greater-than-desirable deformation of the workpieces 24a and/or 26a. Thus, in some applications, if the workpiece material is excessively deformed, the material displaced from the peripheral zone beneath the welding tip moves longitudinally of the axis of the apparatus 10 (of FIGURE 1) and the length of the workpiece increases. This may not be particularly detrimental to the quality of the peripheral weld per se, but it may be detrimental to the longitudinal strength of the weldment and it may not fit into its intended end location because of the workpiece material buildup ahead of the welding tip as it slides around the periphery of the tube wall. As noted above, such an occurrence can be minimized by rotating the entire welding head housing, including the gimbal ring, so that the welding tip executes both counter-rotation and precession within the tube-type workpiece.

Figure 5:
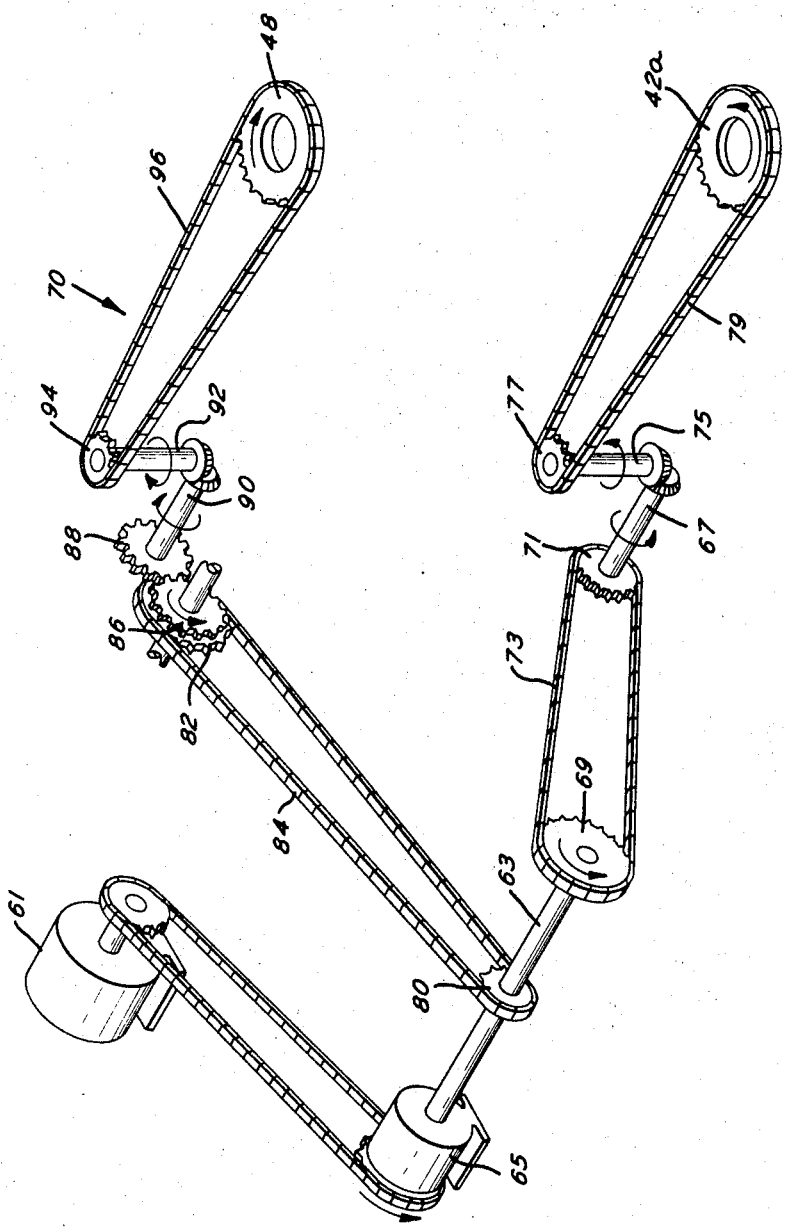
FIGURE 5 is a perspective view of the two driving systems associated with the embodiment of FIGURE 4, i.e., the force-rotation drive and the back-rotation drive.

As may be seen more clearly in FIGURE 5, the reversed rotation of the assembly 30a may be accomplished from the same power source that is used to rotate the force system 40a.

Motor 61 is coupled to shaft 63 through clutch 65. Shaft 63 is connected to shaft 67 by sprockets 69 and 71 coupled by chain 73. Shaft 67 is connected to shaft 75 by bevel gears. A sprocket 77 on shaft 75 is coupled to sprocket 42a by chain 79.

A sprocket 80 on shaft 63 is connected to sprocket 82 by chain 84. Sprocket 82 and a gear 86 are on the same shaft. Gear 86 is meshed with gear 88 on shaft 90. Shaft 90 is coupled to shaft 92 by bevel gears. A sprocket 94 is connected to shaft 92 and coupled to sprocket 48 by chain 96.

When the single-revolution clutch 65 is tripped, the gearing and chain drive attached to sprocket 48 back-rotates the apparatus 10a precisely the number of degrees necessary to prevent "slip" of the welding tip 16a as it traverses the inner periphery of the workpiece 24a of FIGURE 4, because the force system is connected to 42a.

It will be appreciated that differing welding applications may require differing amounts of slip-preventing back-rotation. For this purpose, for example, the sprockets in the mechanism may be appropriately changed. Thus, it will be appreciated that the number of back-rotation welding tip peripheral revolutions necessary to complete a single weld is related to the ratio of the diameters of the cylindrical workpiece and of the tip. Thus, if the inner circumference (inner peripheral distance) inside the cylindrical workpiece 24a is $\pi D$ (where $\pi D$ is the diameter of the cylinder), and the outer circumference (peripheral distance around the tip) of the welding tip is $\pi d$ (where $\pi d$ is the diameter of the tip), then the number of tip rotations required for no slip is theoretically $\pi D/\pi d$. However, allowance should be made for the amount of weldment thickness deformation encountered under the conditions of power, clamping force, and time found appropriate for the vibratory welding application. Thus, if a deformation is involved, for example, the ratio would then be $\pi(D+2 \text{ delta})/\pi d$, where delta is the thickness deformation in inches.

Note that there would be no necessity for back-rotation if the welding tip O.D. precisely equaled the weldment I.D. *after* welding, but this is not practical. Therefore, the back-rotation of the welding head and therefore of the tip 16a involves rolling a sufficient distance to make up the differences in periphery.

Figure 6:
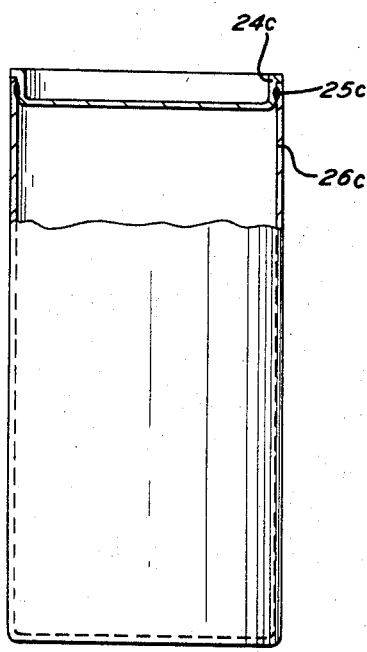
FIGURE 6 is an elevation view of a cylinder partly in section and having a weldment in accordance with the present invention.
Figure 7:
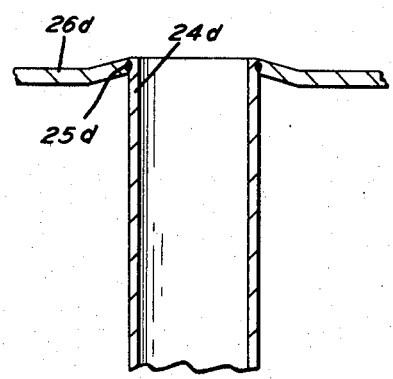
FIGURE 7 is a sectional view of another weldment in accordance with the present invention.
Figure 8:
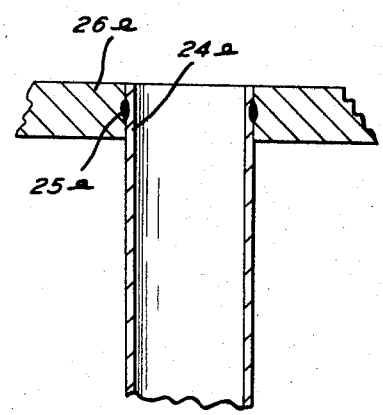
FIGURE 8 is a sectional view of still another weldment in accordance with the present invention.

FIGURES 6, 7 and 8 are views of representative weldments attainable by means of the present invention. FIGURE 6 shows a weldment generally similar to the weldments in FIGURES 1, 2 and 4 wherein the upstanding flange on a cover is welded to the open end of a cup-shaped container 26c by a weld 25c. FIGURES 7 and 8 show weldments of the so-called tube-to-header variety, wherein the inner workpiece 24d or 24e is in the form of a tube or cylinder which is welded to the wall of a hole in a plate such as plate 26d or 26e by welds 25d and 25e respectively.

Figure 2:
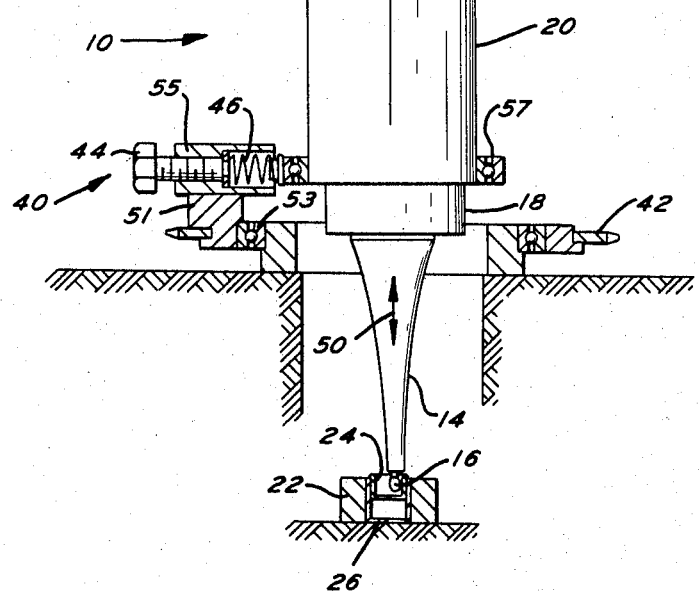
FIGURE 2 is an enlarged view of the welding tip and weldment region of FIGURE 1.
Figure 2:
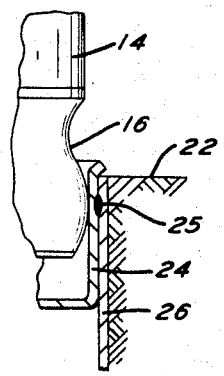
Figure 9:
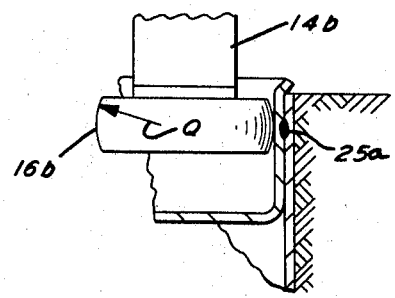
FIGURE 9 is a view of a welding tip suitable for use with the present invention.

It is to be noted that the tip 16 of FIGURES 1 and 2 and the tip 16a of FIGURE 4 have two radii; one equals one-half the welding tip diameter, and the second is ordinarily called the crown radius and is designated Q on FIGURE 9.

However, those skilled in the art may use other types of welding tips. Thus, FIGURE 9 shows disk tip 16b attached to a terminal end of member 14b. Tip 16b has a particular utility with large weldments; i.e., those weldments whose inner periphery may be so great as to cause problems with tip acoustical dimensioning limitations and/or with engineering limitations associated with the rotation system. It will be appreciated that it would be generally undesirable to have more than two or three rotations of the welding head, during the course of making a weld during a time interval of one second, for example. Also, sudden accelerations of the rotation system from a standing start require careful handling; the sudden impact on the system of more than about three revolutions/second (180 r.p.m.) is also generally undesirable. Solution of both the acoustical and the engineering problem may be afforded by utilization of the tip of 16b, which is illustrated and described in detail in United States Patent 3,017,792 entitled "Vibratory Device," which issued Jan. 23, 1962 in the names of William C. Elmore and Carmine F. De Prisco.

Using an apparatus of the type of FIGURE 4, weldment samples were made comprising tubes made of 6061–T6 aluminum alloy (0.210 in. O.D., 0.010 in. wall thickness, 9.2 in. long) and header plates made of 5052–F aluminum alloy (10 in. dia., 0.25 in. thick). Each of the header plates had been drilled and reamed with holes equally spaced on 0.250 in. centers, symmetrical in a hexagonal network (the holes being dimensioned to provide close fits for the tops of the tubes). With the vibratory apparatus having a nominal design frequency of 15 kc. (with a magnetostrictive transducer), satisfactory welding of tube ends within plate holes was achieved with the following welding machine settings: 1,000 watts of electrical powerinput to the transducer, 160 pounds clamping force, and rotational speed of 65 in./min. The welds had push-out strengths up to 230 pounds. It is ordinarily preferable to employ the apparatus above described in the vertical position, so as to avoid the use of counterweights for the mass of the welding head.

Inasmuch as the high order of contact between the tip and the inside diameter of the weldment results in the weld's being formed over perhaps as much as 20–30 degrees of arc, it has been found desirable in some cases and necessary in others to terminate the duration of the ultrasonic power application interval several degrees prior to the completion of the 360 degrees of force rotation. That is, the ultrasonic power pulse under these circumstances may run from time equals zero to time equals 350 degrees of rotation. In some instances when this is not done, the welding tip tends to tear the metal previously welded as the welding tip completes its 360 degrees of precession under the influence of the rotation clamping force vector.

Apparatus 10 and 10a are designed to operate at substantially a given frequency, which is preferably a resonant frequency. Each resonant element of apparatus 10 and 10a are preferably dimensioned to have an over-all physical length equivalent to an acoustical length of one-half wavelength (or a whole number multiple of one-half wavelength) in the material and geometry of which it is made at the said frequency, in the longitudinal mode, so as to have, for efficient operation, a substantially low-stress area at the interfaces.

Transducers may be of the magnetostrictive type as shown and of conventional construction comprising a half-wavelength-long laminated core of nickel, nickel-iron alloy, or other magnetostrictive material, properly dimensioned to insure axial resonance with the frequency of alternating current applied thereto by its excitation coil so as to cause it to increase or decrease in length according to its coefficient of magnetostriction. The detailed construction of a suitable magnetostrictive transducer is well known to those skilled in the art and does not form a part of the present invention, and accordingly, no description of its construction will be made herein. It will be appreciated by those skilled in the art that in place of the magnetostrictive transducers other known types of transducers may be substituted; for example, electrostrictive or piezoelectric transducers made of barium titanate, quartz crystals, lead zirconate titanate, etc., may be utilized.

As aforesaid, the transducer is provided with an excitation coil. The excitation coil may be connected to a power supply (incorporating an amplifier, not shown, and oscillator, not shown) suitable for powering the transducer; such equipment is well known to the art. The transducer is also provided with a polarizing coil. The desirability of magnetically polarizing the magnetostrictive transducer by means of such a polarizing coil, in order for the metal laminations in said transducer to efficiently convert the applied energy from the excitation coil into elastic vibratory energy, is also readily understood by those skilled in the art. Low voltage direct current can be supplied to the coil by battery, rectifier, or other means well known to the art.

The aforesaid power supply system, in a typical example, is capable of producing electrical signals in the range of between about 60 cycles per second and about 300,000 cycles per second. This frequency range is suitable for purposes of the present invention, including as it does frequencies in both the audible range (such as up to about 15,000 cycles per second) and the ultrasonic range (generally above about 15,000 cycles per second). A preferred frequency would be in the range of from about 3,000 to about 75,000 cycles per second, with the optimum being between about 14,000 to about 50,000 cycles per second. Normally, a frequency is chosen which will provide a suitable size of apparatus for a given application or set of applications, with the ultrasonic range having the further advantage of inaudibility for operator comfort.

Thus, apparatus 10 (except for anvil 22) may be constructed to operate at 15,000 cycles per second, for example. In an operative embodiment of FIGURE 1, a 2000-watt power supply was used to power the transducer at said 15 kc. design frequency.

As is well known to the art, the electrical frequency of the alternating current power supply (such as 60 cycles per second) is changed to match the mechanical or elastic vibratory frequency of the transducer (15,000 cycles per second in this example, as aforesaid).

It is to be noted that the source of high frequency alternating current may be a motor alternator if it has suitable frequency control. Such a motor alternator source is particularly appropriate for applications requiring relatively large amounts of power.

Fixedly secured (preferably by brazing or some other type of metallurgical joint) in end-to-end contact with the transducer is an acoustical coupling member 14. Coupling member 14 is preferably made from aluminum-bronze, beryllium-copper, K-Monel, or any other material having low hysteresis, good thermal conductivity, and high transmission efficiency even when strained as much as 0.001-inch per inch, for example. The materials named are non-magnetic and are known to the art for their relatively good acoustical power handling qualities. The relatively good thermal conductivity of beryllium-copper or aluminum-bronze aids in dissipating excess heat from the transducers, thereby lessening the cooling problem. K-Monel has a higher sound velocity than beryllium-copper (and therefore a longer wavelength), but it is sometimes difficult to machine and braze well, particularly in unusual geometries.

Acoustical coupling members 14 and 14a are essentially mechanical transformers and are of contoured construction, for purposes including providing for an increase in the amplitude of longitudinal mode vibration. As aforesaid, acoustical coupling member 14 has a physical length equivalent to an acoustical length of an integral number of one-half wavelengths in the material of which it is made at the design frequency for the apparatus.

Acoustical coupling member 14 may comprise a single member or, for purposes of manufacturing or other engineering convenience, it may comprise two or more members joined in end-to-end contact, the tapered portions, if any, by means of their increasingly smaller cross section affording the increased amplitude. The tapered portions may be shaped so as to provide a linear taper, for example, or a taper that is an exponential function of its length and satisfies the following equation:

$$S = S_0 e^{-2Tl}$$

where S is the reduced area at any section of the tapered portion, $S_0$ $l$ is the area of the untapered portion, T is a constant describing the taper, and is the length of the tapered portion. This equation and the boundary conditions for resonance of couplers such as couplers 14–14a are set forth at page 163 of Piezoelectric Crystals and Ultrasonics by Warren P. Mason, published in 1950 by D. Van Nostrand Company.

In accordance with principles well known to those skilled in the art, for efficient operation as for avoiding changes in sound velocity, mode, etc., the solid-portion-diameter cross section of coupling member 14 is no more than about one-half and preferably no more than about one-quarter wavelength.

To the other end of member 14 of FIGURE 1 is attached a welding tip 16. The tip 16 thereby executes longitudinal vibration in a plane essentially parallel to the weld interface. The weldment members 24 and 26 are positioned intermediate the tip 16 and the anvil assembly 22. During delivery of vibratory energy to the weldment, clamping force is applied by means of a force system such as that described above.

For welding purposes, the tip 16 clamps the metal members 24 and 26 together with a force in a direction and of a magnitude to hold the members 24 and 26 in intimate contact at the intended weld zone.

The tip 16 is preferably metallurgically bonded to the member 14. The tip 16 is dimensioned for longitudinal vibration as a part of the member 14, as is within the skill of the art. The tip 16 may be made of the materials above described, or it may be made of other materials (usually harder materials), such as those chosen principally for the work application per se, rather than for their acoustical properties, provided that such change in material for the tip 16 is taken into consideration in connection with the design of the member 14 and of the apparatus 10 for efficient operation at substantially a resonant frequency.

Said anvil assembly 22 is, as aforesaid, noncompliant in the longitudinal mode at the frequency of operation of the machine. Thus, it may be powered or non-powered but in any event is longitudinally rigid, i.e., noncompliant, with respect to the oscillations of the tip 16. Assembly 22 is both nonresponsive to excursions of the tip and sufficiently rigid to facilitate the provision of the clamping force mentioned above which must be sufficient to maintain the workpieces in intimate contact at the intended weld zone and to couple mechanical vibratory energy into said zone.

Such force for maintaining the workpieces being welded in regulated alignment and firm contact may be varied over a wide range, which may be readily ascertained by the user. In a preferred embodiment, the maximum clamping forces need not produce an external deformation of more than about ten percent in weldments effected at room or ambient temperatures. (By deformation is meant the change in thickness dimensions of the weldment adjacent the weld zone divided by the aggregate thickness dimensions of the weldment members prior to welding; result multiplied by 100 to obtain percentage.) In many cases the extent of deformation is appreciably below 10% and in some instances may be virtually absent altogether.

Welding in accordance with the present invention may be accomplished within a wide time range of between about 0.001–seconds to about 6.0 seconds, with welding under most normal conditions being effected during as brief a time interval as possible for a given application, such as the making of a weld of a given strength.

Available ultrasonic welding data indicate that, although meticulous attention to surface preparation is not necessary (for welding per se as opposed to reproducible and quality welding), oxide-free and degreased surfaces respond more readily to welding, as a general rule.

A wide variety of materials may be welded together by means of the present invention, including especially metals and alloys, although various metallic, semimetallic, and nonmetallic combinations may be made.

Research has shown that the temperature rise commonly observed in ultrasonic welding of metals is in the range of 35%–50% of the homologous melting temperature. In most cases, this is below the temperature at which metal recrystallization takes place, and temperatures during welding can usually be controlled within limits that are probably adequate to preclude recrystallization where desirable.

For a description of a type of ceramic transducer which may be used, see United States pending patent application No. 456,900, filed May 11, 1965 in the names of James Byron Jones and Nicholas Maropis and entitled "Transducer Assembly."

The force-insensitive mount 18 comprises a sleeve fixedly secured at one end to the coupling member 14. The opposite end of the sleeve is free from securement with the coupler member 14. A radially outwardly directed flange (not shown) is provided on the mount 18 intermediate its ends and is attached to the housing 20. The force-insensitive mount, which is dimensioned to operate at the nominal frequency of the device, permits the apparatus 10 and 10a to be mounted on an external member without transmitting any appreciable amount of vibratory energy to the external member. The device will operate without it, but its inclusion is preferred for best operation, especially in applications requiring the use of force.

The flange on the mount 18 is positioned at the node one-quarter wavelength from the fixed end, which is also an acoustical (though not physical) one-quarter wavelength from the free end (see U.S. Patent 2,891,178). The mount 18 comprises a cylindrical metal shell, such as a cylindrical steel shell or a shell of other suitable material. The mount 18 has a length of one-half wavelength according to the metal used at the applied frequency, or a length equal to a unit number of one-half wavelength. The fixed end on the mount 18 is metallurgically bonded to a cylindrical portion of the coupler member 14 at an antinode or loop on the coupler member 14, which is a zone of minimum stress and maximum particle displacement.

The present invention may be embodied in other specific forms without departing from the spirit or essential attributes thereof and, accordingly, reference should be made to the appended claims, rather than to the foregoing specification as indicating the scope of the invention.

We claim:

1. A method for welding metal members together, which method comprises holding contacting to-be-welded juxtaposed arcuate faces of the metal members together with a force which is sufficient to hold the contacted to-be-welded faces of the metal members in intimate contact and to couple mechanical vibration into the to-be-welded metal members in the zone to be welded, introducing to said intimately contacted metal members mechanical vibration having a frequency of between about 59 and 300,000 cycles per second comprising a vibratory component which is substantially parallel to the interfaces between the contacting metal members, said vibratory component being at a sufficient energy level to weld the metal members to each other, and moving a force applying member to move the direction of application of the holding force about an axis substantially coinciding with the axis of curvature of said arcuate faces.

2. A method in accordance with claim 1 wherein the mechanical vibration is introduced into said metal members by a welding tip, and rotating the welding tip about an axis substantially perpendicular to the direction of said force and in direction opposite to the direction of movement of the holding force, such movement of the holding force being rotary movement about an axis substantially coinciding with said axis of rotation for the tip.

3. A method in accordance with claim 2 wherein the speeds of rotation of the tip and holding force differ as a function of the diameter of the tip and the diameter of the arcuate faces.

4. A method in accordance with claim 1 wherein one of said metal members is a cylindrical member, and effecting said weld in the form of a closed loop weldment circumscribing said cylindrical member.

5. Apparatus for nonfusion welding contacting arcuate metal members together comprising a force-applying member, means for impelling an end portion of said force-applying member against an arcuate outer face of one of said contacting metal members with a force in a direction and of a magnitude to hold the to-be-welded faces of the metal members in intimate contact at the intended weld zone and to couple mechanical vibratory energy into the intended weld zone, means for axially vibrating said end portion of said member with continuous wave vibration having a frequency of between about 59 and 300,000 cycles per second in a path substantially perpendicular to the direction of the applied force while such to-be-welded faces of the metal members are being held in intimate contact by engagement with said end portion of said member, with said vibrating means furnishing sufficient power so that the mechanical vibration delivered by said end portion in said path is at a sufficient energy level to weld the metal members together, a housing means coupled to said force-applying member, a gimbal ring connected to the upper end of the housing means to support the same, and means mounting the impelling means for rotation about the longitudinal axis of said housing means.

6. A nonfusion method for welding metal members together which method comprises placing to-be-welded faces of the metal members together, applying a force to the metal members in a direction and of a magnitude to hold the contacting to-be-welded faces of the metal members in intimate contact at the intended weld zone and to couple mechanical vibratory energy into said zone, introducing longitudinally through a vibrating element contacting one of the to-be-welded metal members adjacent the weld zone mechanical vibration having a frequency of between about 59 and 300,000 cycles per second, said mechanical vibration comprising a vibration component in a direction substantially perpendicular to the direction of applied force, and with such component being of an energy level sufficient to weld the metal members to each other, while moving said element so that its longitudinal axis generates a cone about a point thereon and remote from said zone.

7. A method for welding metal members together which method comprises holding contacting to-be-welded faces of the metal members together between a welding tip and an anvil member with a force of a magnitude and direction to hold the to-be-welded faces of the metal members in intimate contact at the intended weld zone and to couple mechanical vibratory energy into said zone, introducing substantially continuous wave mechanical vibration having a frequency of between about 50 and 300,000 cycles per second to said intimately contacted metal members through said tip which is engaged with an outer face of one of the metal members adjacent the intended weld zone, said substantially continuous wave mechanical vibration comprising a vibration component in a direction substantially perpendicular to the direction of the holding force and with such component being of an energy level sufficient to weld the metal members to each other with the temperature in the weld zone (such temperature being that which can be determined with a thermocouple) during the introduction of the vibration being below the melting temperature of any of the metal members, and rotating the position of application of said force about an axis substantially parallel to said faces, while moving said tip so that its longitudinal axis generates a cone about an apex remote from said zone.

8. Apparatus for nonfusion welding contacting metal members together comprising a force-applying member, means for impelling an end portion of said force-applying member against an outer face of one of said contacting metal members with a force in a direction and of a magnitude to hold the to-be-welded faces of the metal members in intimate contact at the intended weld zone and to couple mechanical vibratory energy into the intended weld zone, means for vibrating said end portion of said member at a frequency of between about 50 and 300,000 cycles per second in a path substantially perpendicular to the direction of the applied force while such to-be-welded faces of the metal members are being held in intimate contact by engagement with said end portion of said member, with said vibrating means furnishing sufficient power so that the mechanical vibration delivered by said end portion in said path is at a sufficient energy level to weld the metal members together, means supporting said member so that it may be moved with its longitudinal axis generating a cone having its apex at the supporting means, and means for rotating the location of application of the impelling force about the longitudinal axis of said force-applying member.

9. Apparatus in accordance with claim 8 including means for rotating said member about its longitudinal axis, and said means for rotating the location of application of the impelling force being rotatable in a direction opposite to the direction of rotation of said member.

10. Apparatus in accordance with claim 8 wherein said supporting means is a gimbal ring, and means for rotating said gimbal ring about the longitudinal axis of said member.

11. Apparatus in accordance with claim 10 including a motor, and means coupling said motor to the impelling means and a gimbal ring to rotate the same in opposite directions.

12. Apparatus in accordance with claim 8 including a support mounted for rotation about the longitudinal axis of said member, said impelling means being mounted on said support for rotation therewith, and means coupled to said support for selectively rotating the same.

13. Apparatus in accordance with claim 8 including a housing member having one end portion coupled to said force-applying member by a force-insensitive mount, the other end of said housing member being connected to said supporting means, said impelling means being coupled to said housing member adjacent said one end portion thereof.

References Cited
UNITED STATES PATENTS

| | | | |
|---|---|---|---|
| 2,996,600 | 8/1961 | Gardner et al. | 219—61 |
| 2,946,120 | 7/1960 | Jones et al. | 29—470 |
| 3,217,957 | 11/1965 | Jarvis et al. | 228—1 |
| 3,247,591 | 4/1966 | Panseri | 29—474.3 |

JOHN F. CAMPBELL, *Primary Examiner.*

R. B. LAZARUS, *Assistant Examiner.*

U.S. Cl. X.R.

219—82; 29—497.5, 498; 228—1, 29, 45